Figure 1:
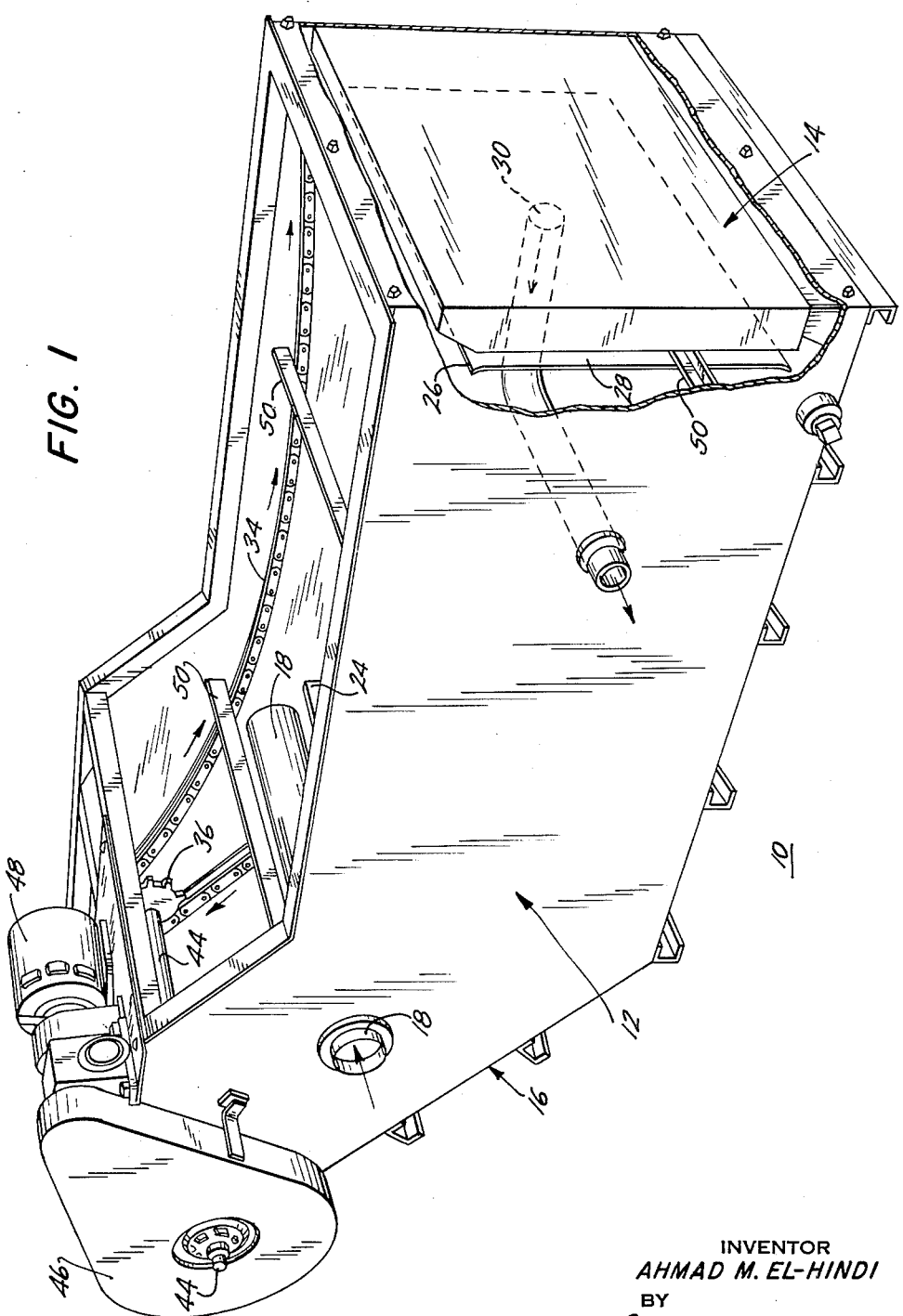

July 3, 1962 A. M. EL-HINDI 3,042,211
FILTER FOR LIQUIDS CONTAINING MAGNETIC SLUDGE
Filed Aug. 27, 1959 4 Sheets-Sheet 2

INVENTOR
AHMAD M. EL-HINDI
BY
Curtis, Morris + Safford
ATTORNEYS

United States Patent Office 3,042,211
Patented July 3, 1962

3,042,211
FILTER FOR LIQUIDS CONTAINING
MAGNETIC SLUDGE
Ahmad M. El-Hindi, East Syracuse, N.Y., assignor, by mesne assignments, to Hoffman International Corporation, New York, N.Y., a corporation of Delaware
Filed Aug. 27, 1959, Ser. No. 836,478
3 Claims. (Cl. 210—222)

This invention relates to a filter for liquids containing magnetic sludge, more particularly to such liquids as machine tool coolants with entrained steel particles and the like.

An object of this invention is to provide a filter having improved efficiency in removing magnetic solids from any of various liquids, such as machine tool coolants.

Another object is to provide a filter of this kind which is smaller in size yet able to accommodate a higher liquid flow rate than previous similar filters.

These and other objects will in part be understood from and in part pointed out in the description given hereinafter.

In machine tool operations, it is common practice to play a stream of liquid coolant on the cutting or grinding tools and on the workpiece to keep them at a safe temperature, to provide some lubrication, and to carry away the metal particles which have been removed from the work. Now, for the machining operation to proceed smoothly it is necessary to have an ample supply of clean coolant. However, since the coolants commonly used are relatively expensive, it is desirable to re-use the liquid continuously rather than to discard it and use new coolant. A fact complicating the re-use of the coolant is that each time it passes over the work it become contaminated with metal particles and sludge. For best efficiency this solid material must be removed from the coolant before re-use, hence the need for an effective, though inexpensive filter.

Where steel and similar magnetic materials are being machined, it is possible to separate by means of powerful magnets most solids carried away from the work by the coolant. A filtering arrangement of this kind has the important economic advantage of not requiring constant replacement of filter elements (i.e. filter paper, etc.). Unfortunately, though, the efficiency of the more practical magnetic-type filters has been only moderately good. In spite of this, a filter such as shown in U.S. Patent No. 2,670,847, has enjoyed wide commercial success. The present invention provides a filter of this general type and having its important advantages but possessing greatly improved efficiency. In certain instances for a comparable unit, this new filter has almost 50% greater filtering efficiency than an old unit. This means that a substantial reduction in size together with an increase in flow rate can be obtained without sacrifice in magnetic particle removing ability.

In accordance with the present invention there is provided a filter similar to the one described and claimed in the above-mentioned U.S. patent, but with a new and improved combination of filter magnet assembly, clean filtrate outlet and self-cleaning scrapers. The magnet assembly includes a number of individual horseshoe magnets uniquely oriented relative to each other to produce a strong magnetic field in front of and surrounding the mouth of the outlet for filtered liquid. This magnetic field is arranged so that as the scraper blades remove accumulated sludge from the magnet assembly, the magnetized particles will not be moved from a region of one magnetic polarity to the opposite. Thus they tend to cling together and can be scraped away without dispersing them into the clean liquid being drawn from the filter. The mouth of the clean liquid outlet is spaced opposite and leads away from the magnet assembly and this position further aids in preventing sludge from escaping in the outgoing, filtered liquid. The filtering efficiency of this new unit is as high as 97% removal of magnetic solids.

Figure 2:
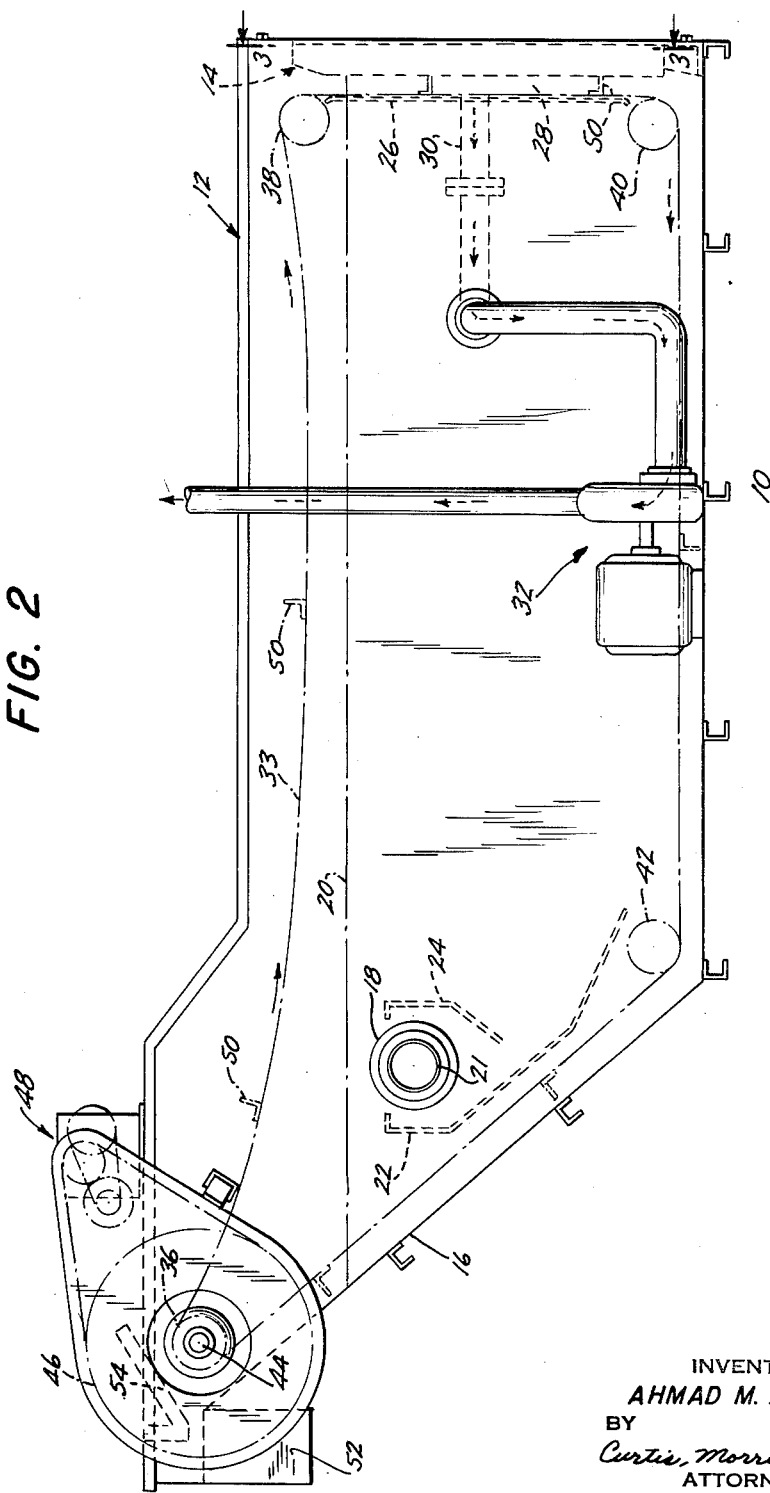
Figure 3:
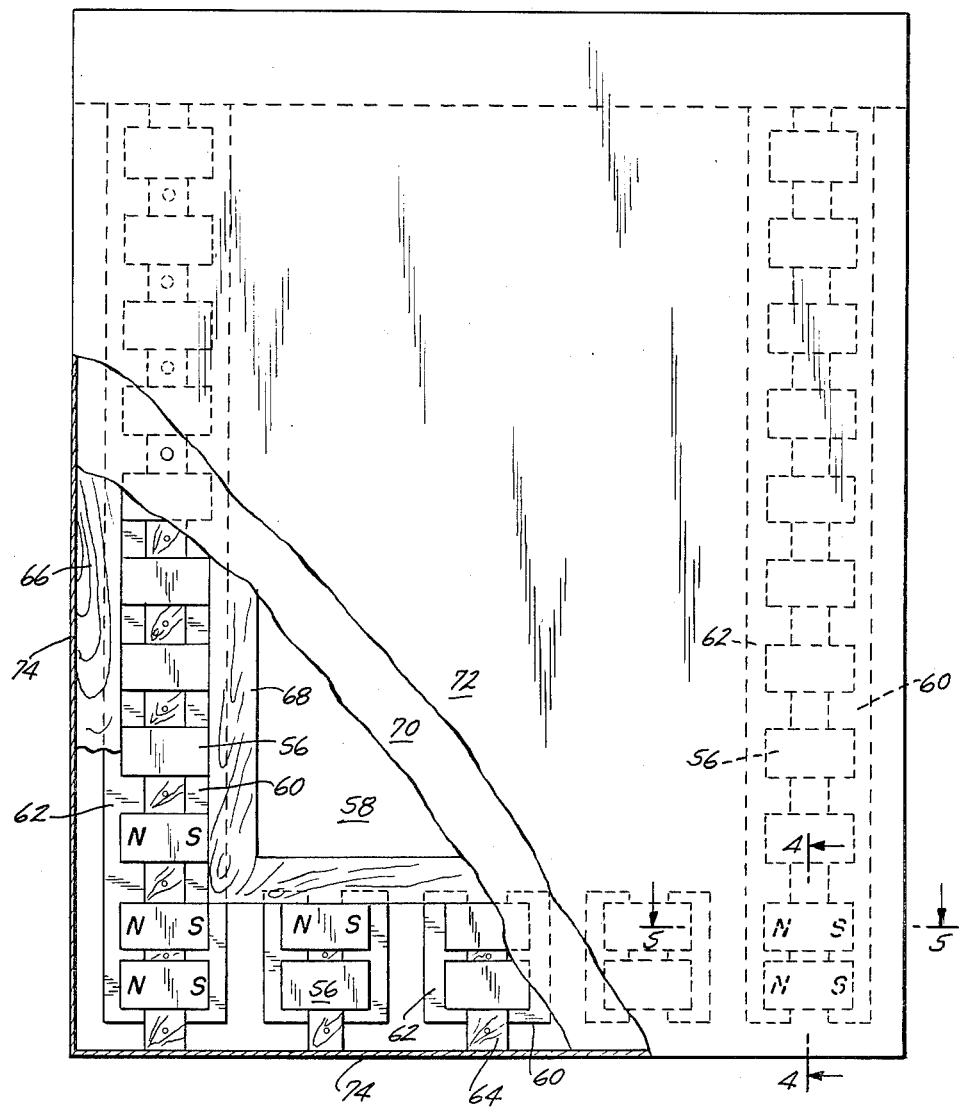
Figure 4:
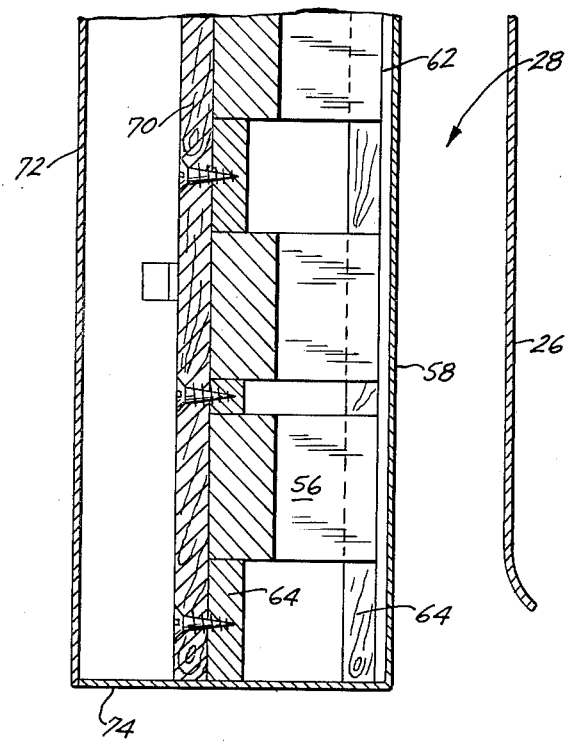
Figure 5:
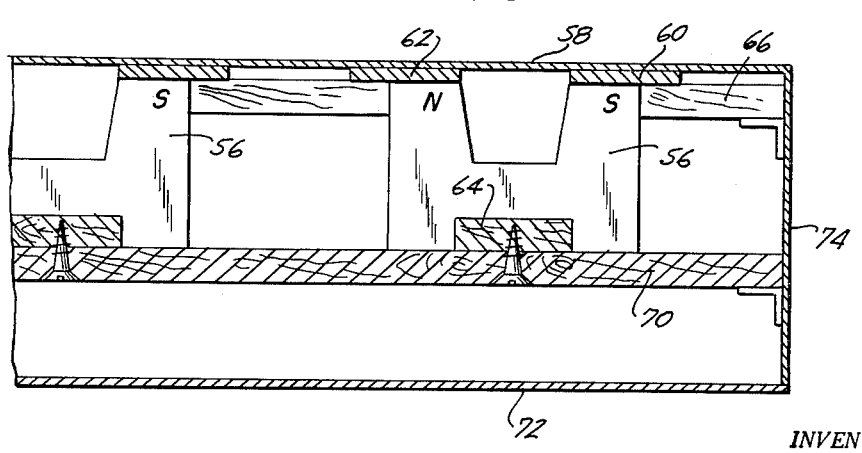

A better understanding of the invention together with a fuller appreciation of its many advantages will best be gained from the following description given in connection with the accompanying drawings wherein:

FIGURE 1 is a perspective view, partly broken away, showing a filter unit embodying features of the invention;
FIGURE 2 is a side section view of the unit;
FIGURE 3 is an enlarged view of the magnet assembly taken as indicated by lines 3—3 in FIGURE 2;
FIGURE 4 is a further enlarged section view taken as indicated by lines 4—4 in FIGURE 3; and,
FIGURE 5 is a similar section view taken as indicated by lines 5—5 in FIGURE 3.

As seen in FIGURES 1 and 2, the filter unit 10 provided according to the invention comprises a rectangular housing or tank 12 having a hollow interior defined by sheet metal side walls. The right end wall comprises a magnetic filter assembly 14, to be described in detail shortly, and the left end wall 16 is inclined upward and backward. Liquid contaminated with sludge to be filtered out is admitted to the tank near the left through an inlet pipe 18 which extends horizontally between the side walls adjacent rear sloping wall 16 and is positioned somewhat below the normal liquid level indicated by numeral 20. This inlet pipe has a narrow slit 21 on its underside through which the incoming liquid is discharged into the unit. Positioned alongside the inlet pipe are baffle plates 22 and 24 which prevent this incoming liquid from unduly disturbing the liquid already in the tank and which provide a slideway toward the bottom of the tank for the heavier solids which tend to immediately settle there. The size of tank or housing 12 is sufficient so that a settling time or delay of four or five minutes for liquid between entering and leaving the tank is provided to permit gravity removal of the heavier, entrained solids.

Positioned to the left of and closely behind the magnetic filter assembly 14 is a flat baffle plate 26 which defines a narrow vertical space 28 between itself and the magnet assembly. Plate 26 has a centrally positioned opening in it comprising the mouth of an outlet pipe 30 through which filtered liquid is withdrawn from tank 12. This liquid before entering the mouth of outlet pipe 30 passes from the sides and bottom of baffle 26 along the narrow vertical space 28, in the course of which virtually all the remaining fine magnetic solids entrained in it are pulled against the face of the filter assembly 14 and collected there. The liquid thus filtered then enters outlet pipe 30 and is re-circulated (see FIGURE 2) by a motor and pump 32 to a point of use, and from there returned to inlet pipe 18 to keep the liquid level within tank 12 approximately at level 20.

Filter 10 is provided with a self-cleaning scraper assembly which continuously removes solids and sludge accumulating in the filter tank. This assembly comprises a pair of endless, parallel conveyor chains 33 and 34 which are mounted as shown in FIGURE 2 on the four pairs of sprocket wheels 36, 38, 40 and 42. Sprocket wheels 36 are fastened on an axle 44 which in turn is driven from one end by a large pulley 46, the latter being belt driven from a gear motor 48. When the filter unit is in operation, this motor rotates continuously and drives conveyor chains 33 and 34 at a slow speed, for example, at about 20 inches a minute and in the clockwise direction as viewed in FIGURE 2. Mounted horizontally between these chains at spaced points are a number of L-shaped scraper blades 50 which are adapted to move slowly down the face of magnetic filter assembly 14, along the bottom of the tank, and up inclined wall 16 to continuously remove solids which have been collected on these surfaces.

This solid material is carried upward by the scrapers above liquid level 20 thus being permitted to drain dry of liquid, and is then dumped through a chute 52 at the rear of the unit into a hopper (not shown). To facilitate this dumping and to clean the scraper blades themselves, there is mounted above and behind axle 44 an auxiliary scraper unit 54 which comes into contact with each blade in succession and cleans it off. The detailed operation of this auxiliary scraper unit and its construction are described in the above-mentioned U.S. patent.

It will be noted from FIGURE 2 that each scraper blade 50 in turn moves vertically downward along and against the face of filter assembly 14 thereby scraping off accumulated sludge. The blades do no scrape this sludge into the mouth of outlet pipe 30. Now, as mentioned previously, the magnetic field provided by this assembly is so oriented that as this material is scraped downward, it is not subjected to changes in the polarity of the magnetic field. Hence, this sludge will slide along but cling to the face of the filter assembly and will not be dispersed into the liquid.

The desired configuration of magnetic field is obtained by positioning within the interior of filter assembly 14 as seen in FIGURE 3 a multiude of powerful permanent magnets 56 each in the shape of a horseshoe and with their like poles positioned on straight vertical lines corresponding to the direction of travel of scraper blades 50 down the face of magnet assembly 14. As seen in FIGURES 3, 4 and 5, the working face of assembly 14 on which sludge is collected comprises a thin sheet 58 of stainless steel, which is relatively non-magnetic. Tightly fastened, for example by tack welding, on the inner side of this sheet 58 are pairs of thin vertical strips 60 and 62 of magnetic steel which provide magnetic bridges between the vertically adjacent magnets 56, strips 60 bridging the south poles (S) and strips 62 bridging the north ones (N). Magnets 56 are held against these strips by magnetic attraction but are also held positively in the spaced relation shown by wooden blocks and strips 64, 66 and 68 and by a wooden backing 70. The latter is enclosed within a rear and side sheet metal walls 72 and 74.

The above description is intended in illustration and not in limitation of the invention. Various changes in the embodiment described may occur to those skilled in the art and these can be made without departing from the spirit or scope of the invention as set forth.

I claim:
1. An improved filter for liquids containing magnetic sludge and solids, said filter comprising a tank for receiving and holding a quantity of liquid to be filtered, a magnetic filter assembly having a plane face collecting surface positioned within said tank, a baffle plate positioned closely in front of said collecting surface and defining a narrow space open to said liquid along the sides and bottom, an outlet pipe having its mouth opening into said narrow space generally at the center thereof, and scraper blades movable linearly across the collecting surface of said filter assembly to remove material clinging thereto, the magnetic field developed by said assembly being non-reversing along the line of movement of said blades, said filter assembly including a plurality of permanent magnets positioned on the rear side of said surface and having their north poles only positioned along at least one line parallel to the line of movement of said blades and having their south poles only positioned along at least another line parallel to said line of movement.

2. The filter as in claim 1 wherein said assembly collecting surface is vertical and comprises a thin sheet of non-magnetic material, a plurality of narrow strips of magnetic material fastened to the rear of said sheet along spaced vertical lines, and a plurality of horseshoe magnets having their like poles positioned on respective ones of said strips, said magnets being arranged in overall U-shaped configuration along the bottom and two side edges of said sheet.

3. The filter as in claim 1 wherein the mouth of said outlet pipe comprises an opening in the center of said baffle plate.

References Cited in the file of this patent

UNITED STATES PATENTS

| | | |
|---|---|---|
| 2,670,847 | Egloff et al. | Mar. 2, 1954 |
| 2,707,557 | Spodig | May 3, 1955 |
| 2,804,162 | Spodig et al. | Aug. 27, 1957 |